(12) United States Patent
Silverman

(10) Patent No.: US 9,185,208 B2
(45) Date of Patent: Nov. 10, 2015

(54) CALENDAR-CALLBACK VOICEMAIL

(75) Inventor: Alexander E. Silverman, Mercer Island, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1537 days.

(21) Appl. No.: 12/342,700

(22) Filed: Dec. 23, 2008

(65) Prior Publication Data

US 2010/0158220 A1   Jun. 24, 2010

(51) Int. Cl.
*H04M 3/42* (2006.01)

(52) U.S. Cl.
CPC .. *H04M 3/42195* (2013.01); *H04M 2203/2072* (2013.01)

(58) Field of Classification Search
CPC ................ H04M 2201/40; H04M 2203/2072; H04M 3/432; H04M 3/48; H04M 3/533; H04M 7/12
USPC ......................... 379/29.06, 210.01; 455/414.1
See application file for complete search history.

(56) References Cited

U.S. PATENT DOCUMENTS

| | | | |
|---|---|---|---|
| 5,742,674 A | 4/1998 | Jain et al. | |
| 5,857,013 A | 1/1999 | Yue et al. | |
| 5,872,841 A * | 2/1999 | King et al. | 379/210.01 |
| 5,894,504 A | 4/1999 | Alfred et al. | |
| 5,953,393 A | 9/1999 | Culbreth et al. | |
| 6,215,859 B1 | 4/2001 | Hanson | |
| 6,370,234 B1 * | 4/2002 | Kroll | 379/45 |
| 6,396,906 B1 | 5/2002 | Kaplan | |
| 6,658,103 B2 | 12/2003 | Sew et al. | |
| 6,950,504 B1 | 9/2005 | Marx et al. | |
| 7,054,918 B2 | 5/2006 | Polcyn | |
| 7,203,294 B2 | 4/2007 | Carnazza et al. | |
| 7,245,713 B1 | 7/2007 | Simpson et al. | |
| 7,376,226 B2 | 5/2008 | Holder et al. | |
| 7,864,931 B2 | 1/2011 | Stillman et al. | |
| 7,864,939 B1 | 1/2011 | Burg | |
| 2002/0128033 A1 * | 9/2002 | Burgess | 455/528 |
| 2005/0138129 A1 | 6/2005 | Adamczyk et al. | |
| 2005/0159983 A1 * | 7/2005 | Sullivan | 705/2 |
| 2006/0045030 A1 * | 3/2006 | Bieselin | 370/260 |
| 2006/0063539 A1 * | 3/2006 | Beyer | 455/456.3 |
| 2006/0245578 A1 * | 11/2006 | Bienfait et al. | 379/265.02 |
| 2007/0280460 A1 * | 12/2007 | Harris et al. | 379/201.01 |
| 2008/0002820 A1 * | 1/2008 | Shtiegman et al. | 379/211.02 |
| 2009/0088168 A1 * | 4/2009 | Varanasi | 455/445 |
| 2010/0091971 A1 * | 4/2010 | Famous | 379/210.01 |

* cited by examiner

*Primary Examiner* — Solomon Bezuayehu
(74) *Attorney, Agent, or Firm* — Baker & Hostetler LLP

(57) ABSTRACT

Calendar-callback voicemail that provides proposed callback times is described herein. Calendar-callback voicemail includes a calendar callback service that access, among other things, calendar information and location information. The calendar callback service uses that information to provide a proposed callback time to the caller, which the caller may accept or reject. A recipient of the voicemail can access the calendar callback service to schedule times in which callback times are not to be proposed. Further, the calendar callback service may connect the caller and the recipient at the time of the proposed call.

31 Claims, 10 Drawing Sheets

CALENDAR-CALLBACK VOICEMAIL

BACKGROUND

If a caller, also referred to herein as a calling party, when placing a call to a called party, also referred to herein as a recipient, is not connected to the recipient, the caller is typically transferred to a voicemail service in order to leave a voicemail message for the recipient. Voicemail systems of the current art are essentially passive messaging services. When a caller leaves a voicemail, the voicemail is stored in a database for later retrieval by another party, usually the intended recipient of the call. Thereafter, it is up to the recipient, the caller, or both, to attempt to connect at a later time. This may lead to some frustration if the caller does not receive a response from the recipient for a period of time. The caller may not even know whether the recipient received the voice message or, unless specified on the voice mail greeting, whether the recipient is even available to retrieve voice mail messages. This may also lead to frustration for the recipient, as conditions that affect the recipient's ability to call the caller back may change over the course of a day or week, or perhaps the recipient may have only a limited period in which to call back but the caller has moved on to other things.

Additionally, there is no way to discern between callers. Telemarketers and pollsters typically are not distinguishable from family, friends and co-workers in a voice-mail service. Thus, someone who receives calls from many different sources has to initially treat all the voice-mail messages equally until such time as the recipient processes through the messages.

SUMMARY

Calendar-callback voicemail is disclosed herein that provides an active way in which a caller may be connected to a recipient. In use, a caller may attempt to call a recipient and be placed into the voicemail service. A calendar-callback service, which may be a component of the calendar-callback voicemail or a separate component, attempts to access one or more schedules to provide a time in which a callback may be placed. For example, the calendar-callback service may access the schedule (or calendar) of the recipient to determine at what times the recipient has designated or has available as callback times. The calendar-callback service then informs the caller of the one or more times and, if approved by the caller, schedules the callback time on the recipient's calendar. In one exemplary embodiment, when the scheduled time arrives, the calendar-callback service automatically calls both the caller and recipient to connect the two.

The calendar-callback service may use other inputs in conjunction with, or separately from, the recipient's calendar to schedule a callback time. For example, the calendar-callback service may access both the caller's and recipient's schedules and determine if there is a common time that both the caller and recipient may have available for a callback. Another input that may be used may be the location of the caller, recipient, or both. For example, the calendar-callback service may prioritize a voicemail received from a caller at a certain location over voicemails received by a caller located at another location. In that example, the priority location may be the recipient's building or home, i.e. co-workers or family receive first priority. The callbacks of lower priority may be designated for alternate times.

The location information used by the calendar-callback service may be determined using various technologies including, but not limited to, assisted global positioning ("AGPS"), Global Positioning System, ("GPS"), and time delay of arrival ("TDOA"). The location information may also be presented to the recipient of the voicemail if the recipient wishes to prioritize the callback based upon location.

In one exemplary use, a connection request is received for a recipient from a calling party. If the recipient does not answer the call, the caller is connected to a voicemail service. The voicemail service accesses a calendar-callback service which determines a proposed time at which a connection may be made between the recipient and the caller. The proposed time is sent to the caller.

BRIEF DESCRIPTION OF THE DRAWINGS

The foregoing and other aspects of calendar-callback voicemail will be better understood from the following detailed description with reference to the drawings.

DETAILED DESCRIPTION OF ILLUSTRATIVE EMBODIMENTS

The subject matter of the various embodiments is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly required. It should be understood that the explanations illustrating data or signal flows are only exemplary. The following description is illustrative and non-limiting to any one aspect.

Figure 3:
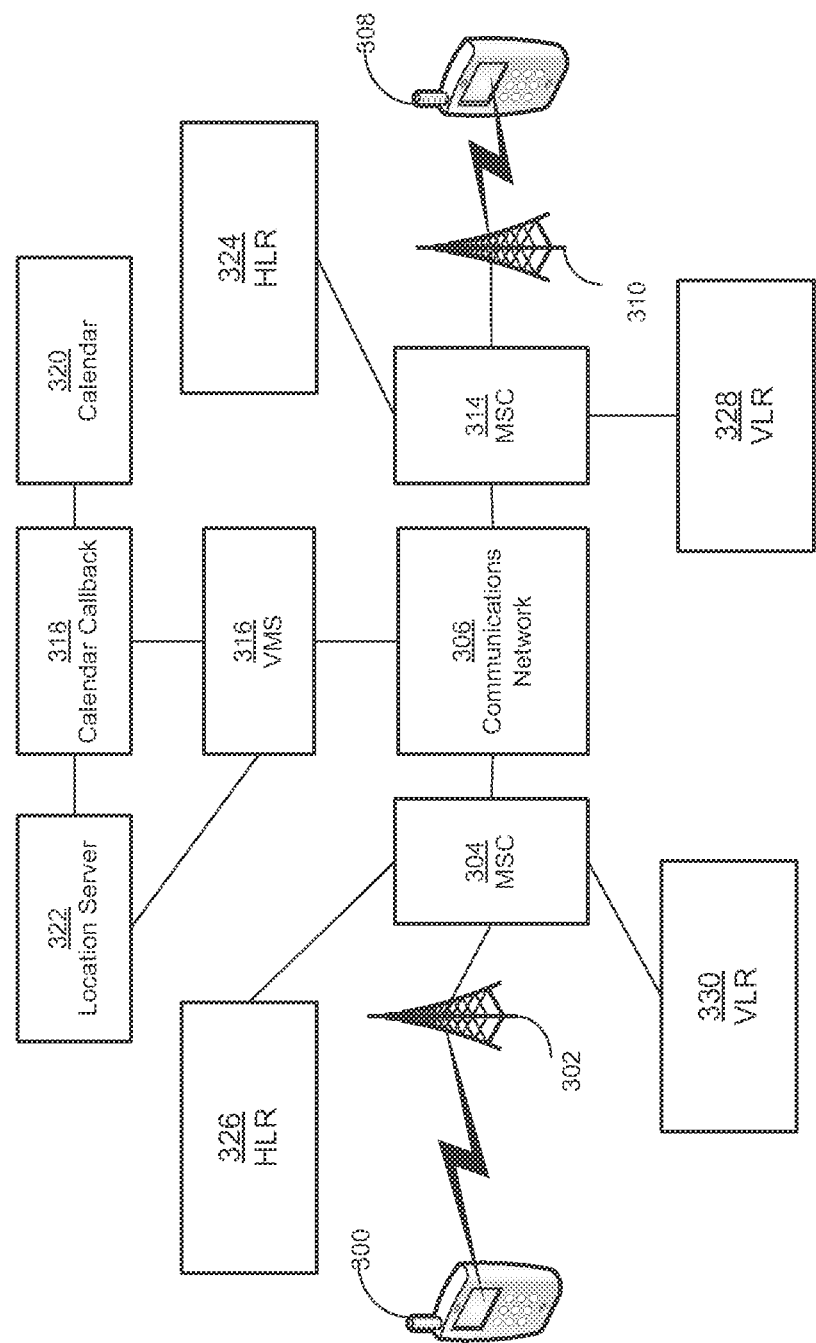
FIG. 3 is an illustration of an exemplary and non-limiting simplified example of a system for providing calendar-callback voicemail using location information.
Figure 10:
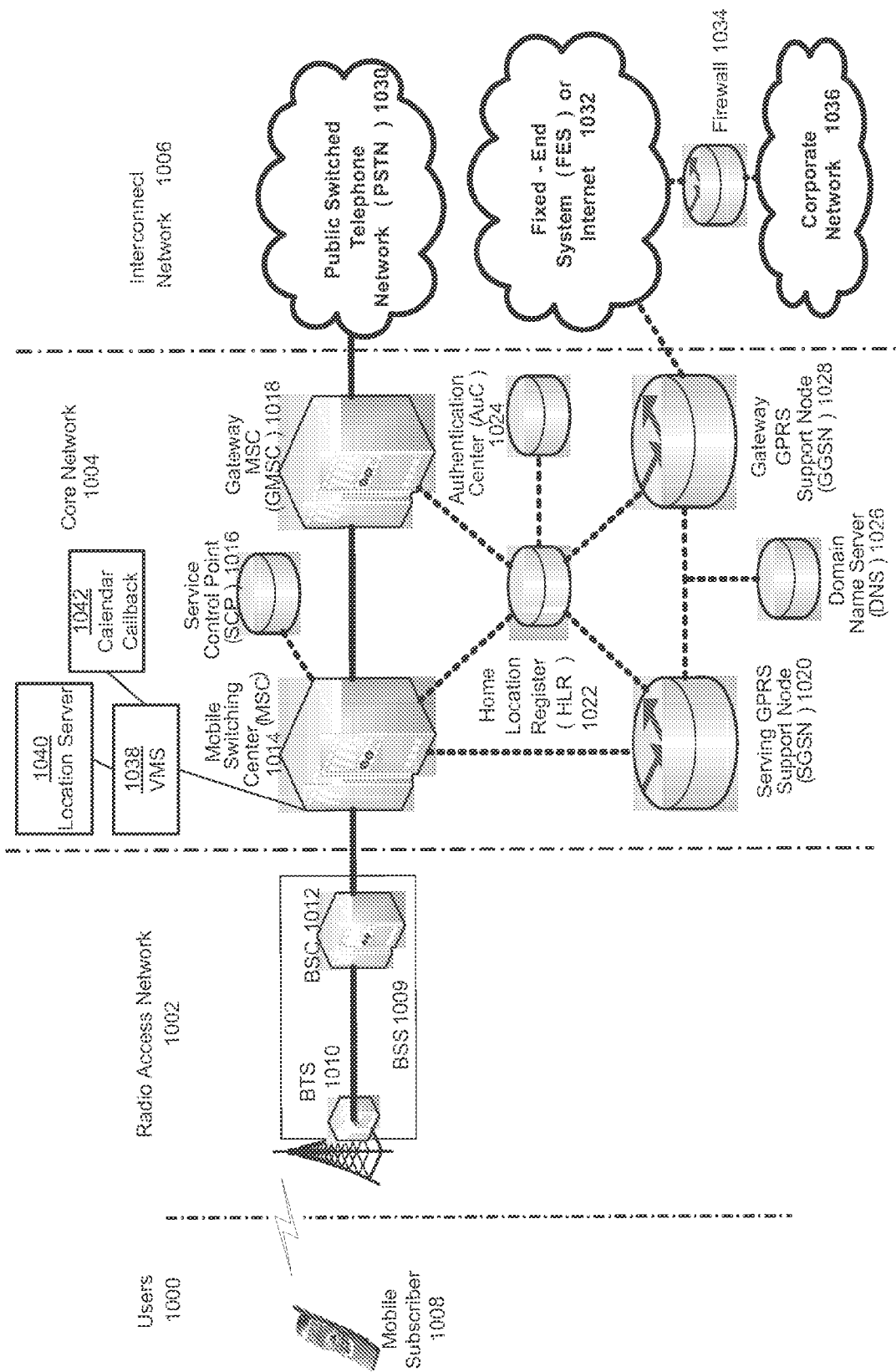
FIG. 10 illustrates a typical GPRS network architecture of as segmented into four groups configured to implement calendar-callback voicemail.

Further, the term "location" may be used in various, non-limiting contexts. For example, the present subject matter may use "location" as used in the context of a Home Location Register ("HLR"), such as HLR 1022, as illustrated in FIG. 10, or Visitor Location Register 330 ("VLR"), as illustrated in FIG. 3. The present subject matter may also use "location" when describing a geographic location. It should be noted that the "location" of one or more devices may be determined using various known systems, such as GPS or TDOA. The present subject matter is not limited to any particular way in which location information may be determined or to any specific communication system in which a location may be determined. Location as it pertains to landline telephones may be determined based on NPA-NXX designations, latitude-longitude address tables, or other methods known by those skilled in the art.

Current voicemail systems are typically passive systems, i.e. a message is stored in a database for later retrieval by the intended recipient. The parties to the call (which may include possibly multiple callers and/or multiple recipients) are thereafter left to their own devices in order to connect. The caller has little to no indication when the recipient of the voicemail may be able to call back, thus leaving the caller in the unenviable position of waiting for the callback or calling the recipient again at a later time. If the recipient is unable to connect when calling back the caller, the recipient will then be forced to either leave a voicemail message for the caller or just hang up, thus entering into a possible back and forth process of leaving messages, sometimes referred to as "phone tag".

To assist both the caller and recipient, calendar-callback voicemail is used. The calendar-callback voicemail is designed to provide at least one time to the caller in which the recipient may call back, thus giving the caller some indication of when to expect a return phone call. Calendar-callback voicemail may use one or more inputs to determine when a callback may be scheduled. Additionally, calendar-callback voicemail may also provide the ability for automatic call connection, wherein at the proposed time, the calendar-callback service attempts to connect the caller and the recipient. These and other features of the present subject matter are discussed in more detail below.

Figure 1:
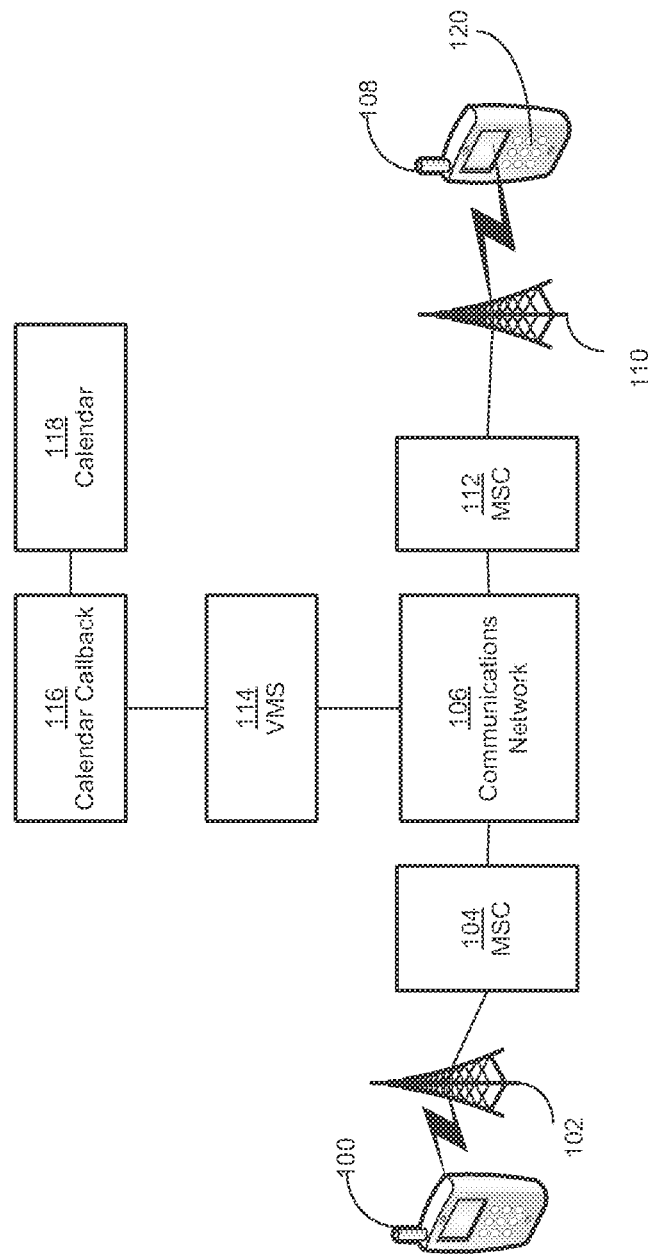
FIG. 1 is an illustration of an exemplary and non-limiting simplified example of a system for providing calendar-callback voicemail.

FIG. 1 illustrates an exemplary and non-limiting system for providing calendar-callback voicemail and highlights certain components that are found in the more complete system description described in FIG. 10. In FIG. 1, mobile device 100 is in communication with mobile switching center 104 through base station 102. The user of mobile device 100 may attempt to place a call to mobile device 108, which for simplicity of illustration is shown as being also in communication with mobile switching center 112 through base station 110. Base station 102 may be used as the transceiver for transmitting a proposed time.

If mobile device 108 is unavailable to receive a call, the user of mobile device 100 may be provided with an option to leave an audio message by voicemail server 114. If the user of mobile device 100 decides to leave an audio message, according to an embodiment of the present subject matter, voicemail server 114 may be configured to not only store the audio message for later retrieval, but also access calendar-callback service 116 to attempt to provide a means in which the user of mobile device 100 may be connected to the user of mobile device 108. It should be noted that calendar callback service 116, although shown as a separate component from voicemail server 114, may be a function of voicemail server 114.

Upon access by voicemail server 114, calendar callback service 116 accesses calendar 118 to attempt to determine a time in which the recipient of the call, i.e. the user of mobile device 108, may be available to call back the user of mobile device 100, i.e. the caller. Calendar 118, an exemplary embodiment of which is described in more detail in FIG. 4 below, is configured to provide information that calendar-callback service 116 may use to determine a callback time. For example, calendar 118 may be the work calendar for the user of mobile device 108. The calendar 118 may be based on Microsoft Outlook® or other commercially available calendars. The user of mobile device 108 may have appointments at certain times scheduled in calendar 118 and have open times that are not scheduled in calendar 118. Additionally, the user of the mobile device 108 may have identified certain times on calendar 118 during which the user intends to return all calls that were received by the voice-mail server. Calendar-callback service 116 uses that calendar 118 information to determine when a callback is possible and perhaps preferred by the recipient.

Once a time is determined, calendar callback service 116 provides the time to the user of mobile device 100, either through voicemail server 114 or other means. As discussed below, depending on the caller's qualification, the time may be a "take it or leave it" time whereby the caller is given no options, it may be a suggested time subject to confirmation by the caller or recipient or both, or it may be no proposed time at all. For example, a caller may have a high level of priority, in which case calendar callback service 116 may look at both the calendars of the caller and recipient to determine a mutually acceptable time. If the caller has medium level of priority, calendar callback service 116 may only look to the calendar of the recipient to determine a proposed time. If the caller has no priority, then the caller may be directed back to voicemail with no proposed time.

Calendar callback service 116 may be used while the caller is connected to voicemail server 114 or at a later time using a different manner of communication. The caller may be provided the option of identifying the preferred means of communication. For example, calendar callback service 116 may be configured to provide the caller with a proposed time via an electronic mail service, short messaging service, or text message. Also, calendar callback service 116 may also be configured to provide a tentative time rather than a firm time for a callback. In other words, in one example, the ability or availability of the recipient for a callback during the proposed time may not be determinable to any degree of certainty. Further, the proposed time may also be transmitted to a third party, such as an assistant to either the caller or the recipient.

Calendar callback service 116 may also be configured to receive confirmation from the user of mobile device 100 that the proposed time, or times, are acceptable. In that situation, calendar callback service 116 may be configured to place an "appointment notice" in calendar 118 that indicates to the recipient that a callback is scheduled. The caller may have various ways provided to them in which to accept the proposed time. For example, calendar callback service 116 may indicate to the caller that the proposed time may be accepted if the caller presses a certain button on the keypad of mobile device 100 and may be rejected if the caller presses a different button on the keypad of mobile device 100. Other ways to accept a proposed time may also be used, including, but not limited to, voice commands from the caller speaking into a microphone of mobile device 100, text messaging, SMS, or email messaging.

The user of mobile device 108, e.g. the recipient of the call, may also be provided with the ability to determine the type of voicemail service the calling party accesses. For example, the recipient may not want the calling party to be provided a callback time, and thus, may want to send the calling party to a typical voicemail system without calendar callback service 116. For example, the recipient may receive a connection request in which the calling party's telephone number is displayed on mobile device 108. The recipient may identify the number as being associated with an individual that the recipient does not want to talk to and/or provide the calling party with a scheduled callback time. Thus, the recipient may want to send the calling party to a voicemail service without the use of calendar callback service 116. To provide for this, mobile device may be configured with soft key 120 on mobile device 108 that instructs voicemail server 114 to not initiate calendar callback service 116. Other means may be provided, including hard keys as well as voice command technology.

It will be appreciated by persons of skill in the art that voicemail server 114 need not be local to one or the other of these mobile switching centers or, indeed, to any particular mobile switching center, but may be placed at any suitable location in the network. Multiple and/or distributed voicemail servers may be used in some embodiments. Further, it should be noted that the invention is not limited to mobile devices, but rather, either or both of a caller's location or the recipient's location could be landlines.

Figure 2:
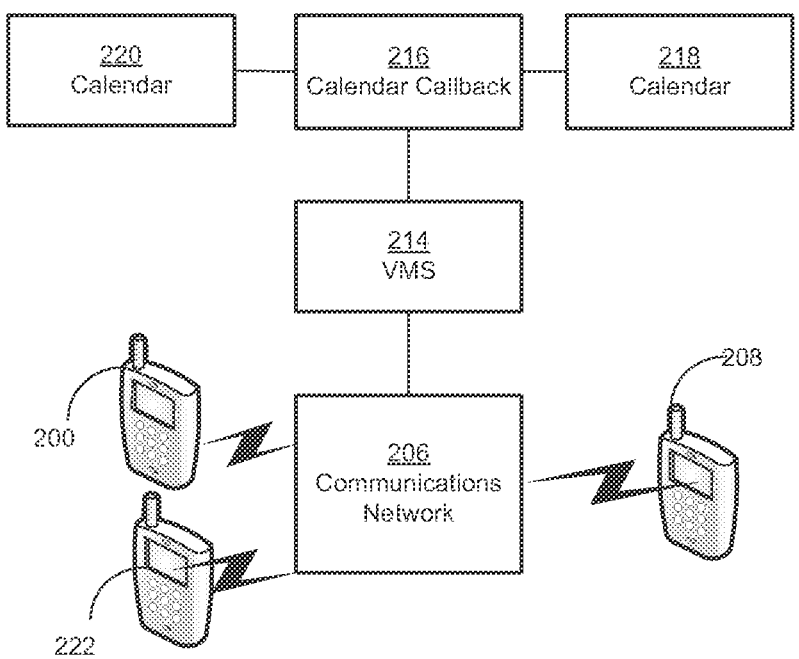
FIG. 2 is an illustration of an exemplary and non-limiting simplified example of a system for providing calendar-callback voicemail using more than one calendar.

Because the schedules of both the caller and recipient may be important in determining proposed time for a callback, a calendar callback service may be configured to access multiple calendars. FIG. 2 is an exemplary illustration of the use of more than one calendar to determine a callback time.

In a manner similar to FIG. 1, a user of mobile device 200 is placed into voicemail server 214 via communication network 206 if the user of mobile device 208 (the recipient) is unavailable to receive the call. Voicemail server 214 accesses calendar callback service 216 to provide a proposed time to the user of mobile device 200. To possibly provide a more accurate time, one that reflects the schedules of both the caller and the recipient, calendar callback service 216 may be configured to access multiple schedules. For example, calendar callback service 216 may access calendar 218 associated with the recipient as well as calendar 220 associated with the caller. Calendar 218 and calendar 220 may be based on Microsoft Outlook® or other commercially available calendars. After comparing the two schedules, calendar callback service 216 may propose a time for a callback based upon, for example, an open time slot on both calendar 218 and calendar 220.

In the instance in which a time slot may be available to multiple callers, calendar callback service 216 may be configured to determine the priority of the callers based upon a set of rules or criteria. For example, if a time slot is available for a callback on calendar 218, the recipient's calendar, and more than one caller has requested a callback, calendar callback service 216 may prioritize one callback over another callback.

For example, the users of mobile devices 200 and 222 may have both left a voicemail and both may be provided with a callback at the same time. In order to determine which caller receives the time slot, calendar callback service 216 may attempt to prioritize the callers. Some ways in which priority may be determined include, but are not limited to, the identity of the callers, the locations of the callers, or the locations of the callers in relation to the location of the recipient. In one example, a recipient may determine that calls from family members take precedence over calls from co-workers except those co-workers that are above in rank, e.g. supervisors, to the recipient. Once a priority is determined, calendar callback service 216 may inform the caller with lower priority that the time either is not available or is no longer available and provide a new proposed time.

Along with the priority determination, the calendar callback service may use the same or similar criteria to qualify a caller and provide service options based on that qualification. The qualification may be based on the caller's importance to the recipient, the location of the callers, or any other type of factors that are set up by the recipient. For example, one qualification of callers may signify a service where both the caller's and the recipient's calendar is consulted and a firm time for a callback is determined. Another qualification of callers may signify a service wherein the caller is given a proposed and perhaps indefinite time to expect a callback. Still yet another qualification of callers may signify a service that no callback time is proposed.

For one or more callers, calendar callback service 216 may also be used to schedule a conference call between two or more callers and the recipient. For example, users of mobile device 200 and 222 may call the user of mobile device 208 in an attempt to setup a conference call. Calendar callback service 216 may recognize that the callers met a certain qualification and schedule a teleconference based upon certain factors, such as the calendars of all three parties, i.e. the two callers and the recipient. An example of a qualification, or criteria, may be that the callers are co-workers of the recipient. Another example may be that the callers are fellow members of the recipient's on-line social network and are designated as "friends" therein by the recipient.

As discussed, location may also be used by a calendar callback service to determine a proposed time for a callback. FIG. 3 is an exemplary system that illustrates the use of location in the present subject matter. A user of mobile device 300 attempts to place a call to the user of mobile device 308, the possible communication pathway if the call is connected being through base station 302, MSC 304, communications network 306, MSC 314 and base station 310 to mobile device 308. If mobile device 308 is not available to connect the call, mobile device 300 is connected to voicemail server 316. As discussed above, to provide a proposed time for a callback, voicemail server 316 may access calendar callback service 318.

As in the example provided with regards to FIGS. 1 and 2 above, calendar callback service 318 may access calendar 320 to determine a proposed time for a callback. Calendar 320 may be associated with the recipient of the call. But, either in conjunction with or in lieu of calendar 320, calendar callback service 318 may also use location information to determine a proposed callback time or to determine the priority of the caller in relation to other callers. For example, a caller located at the recipient's home may have priority over all other callers, e.g. a familial relationship. In another example, a caller located at the recipient's workplace may have priority, e.g. co-worker. In a still further example, callers located closest in geographic proximity to the recipient (either at the time of the call, or at the time of callback) may receive priority—for example, in the case of a service technician making service calls, or in the example of "friends" in a mobile online social network wherein network members can share information about their respective locations with one another in real time or near-real time (e.g., such as the Whrrl.com service offered commercially by Pelago, Inc. of Seattle, Wash.).

The location may be determined using various means. For example, the location may be determined using GPS or AGPS, TDOA, or other types of location determining systems. Additionally, HLR 324 and 326 or VLR 328 and 330 may be used to determine location of either mobile device 300 or mobile device 308, or alternatively, the location of base station 302 or base station 310 in communication with either mobile device 300 or mobile device 308, respectively, may be known and used as the location. Location server 322, which may be a component of or separate from voicemail server 316, may be used to retrieve location information and provide that to either voicemail server 316 and/or calendar callback service 318.

Figure 4:
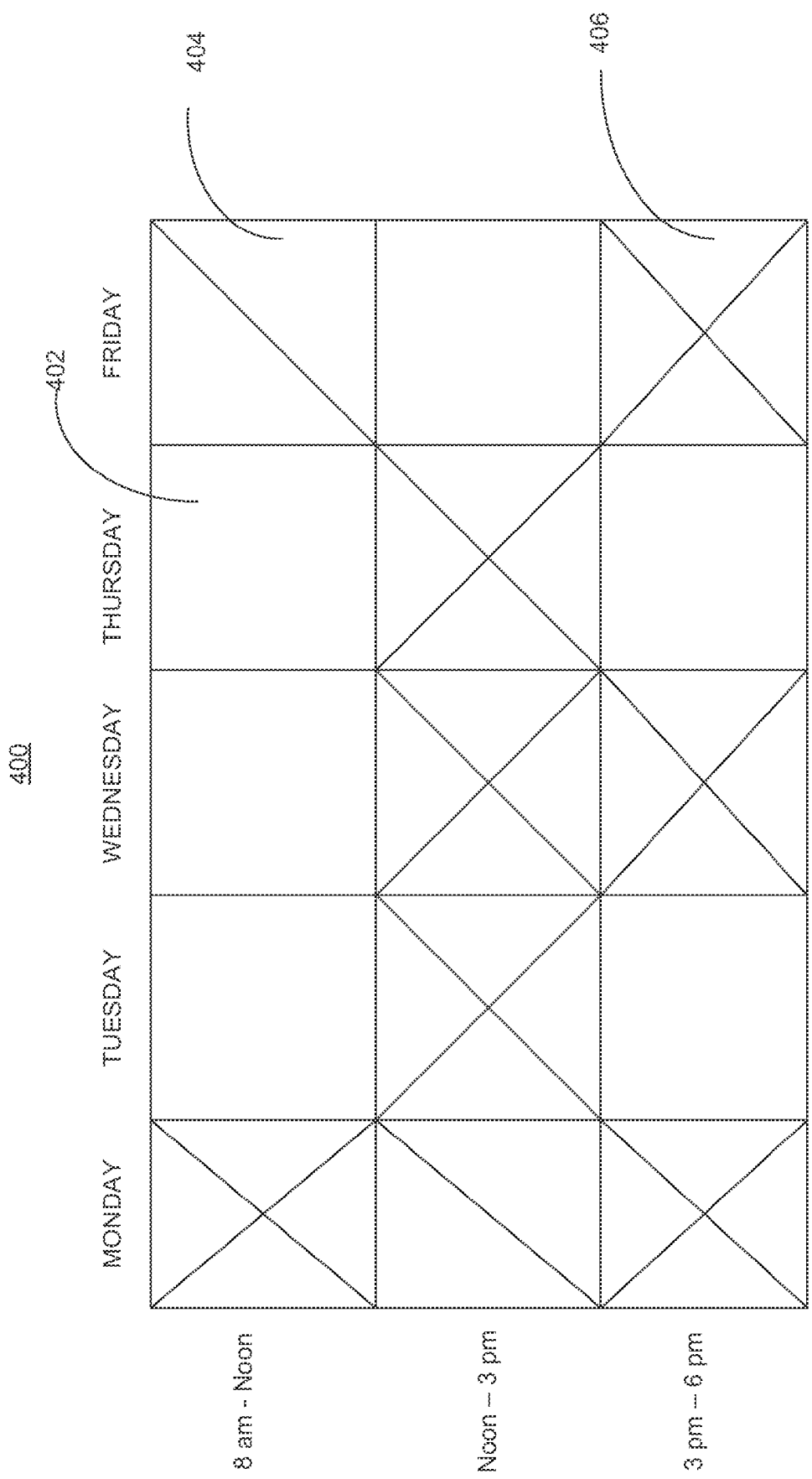
FIG. 4 is an illustration of an exemplary calendar that may be used in conjunction with calendar-callback voicemail.

As discussed above, when determining a proposed time for a callback, calendar callback service 318 access calendar 320. FIG. 4 is an exemplary calendar that may be used by calendar callback service 318. In FIG. 4, calendar 400 (or schedule) is divided into days and time slots, e.g. 8 am-noon, noon-3 pm, and 3 pm-6 pm. The time slots could be more granular as desired. The division of days and time slots are for exemplary purposes only and are not intended to limit the scope of the present subject to that format.

The blocks that are designated with an "X", such as block 406, are times that the recipient is unavailable for a callback. This may be because the recipient has designated that time to be unavailable or because there is an appointment scheduled at that time. For whatever reason, times designated with an "X" are times that should not be provided to the caller as a proposed time. In a different manner, blocks that are designated with a slash or "/", such as block 404, are tentative times. These are times that are not off-limits, such as the times that are designated with an "X" but are not times that are open. The times may be tentative for various reasons. For example, the recipient may have a possible meeting at that time. Another example may be that the recipient may take calls at that time but, if available, would prefer that the proposed time be scheduled during an open time, which are designated as blocks without markings, such as block 402. Moreover, the blocks may be designated as available based on priority or qualification of the callers.

Allowing a calendar-callback service to access a calendar provides for various features in addition to those discussed above. For example, the proposed callback time may be reflective of the actual availability of the recipient to call the caller back. In another example, if calendar 400 is modified and a proposed time is thereafter marked as unavailable, the calendar-callback service may be configured to provide the caller with an updated proposed time, thus keeping the caller apprised of scheduling changes. In a further example, it allows the recipient to block out times prior to receiving a call. In other words, if the recipient wishes to return calls at a specific time each day, the recipient may designate those times as available and block out the remaining time slots. Additionally, if a voicemail is received and a proposed time is accepted by the caller and recipient, the calendar callback service may be configured to schedule the callback as a calendar event, thus providing the recipient with a scheduled callback. This gives the recipient a means by which to actively schedule attention to their voicemail messages.

Figure 5:
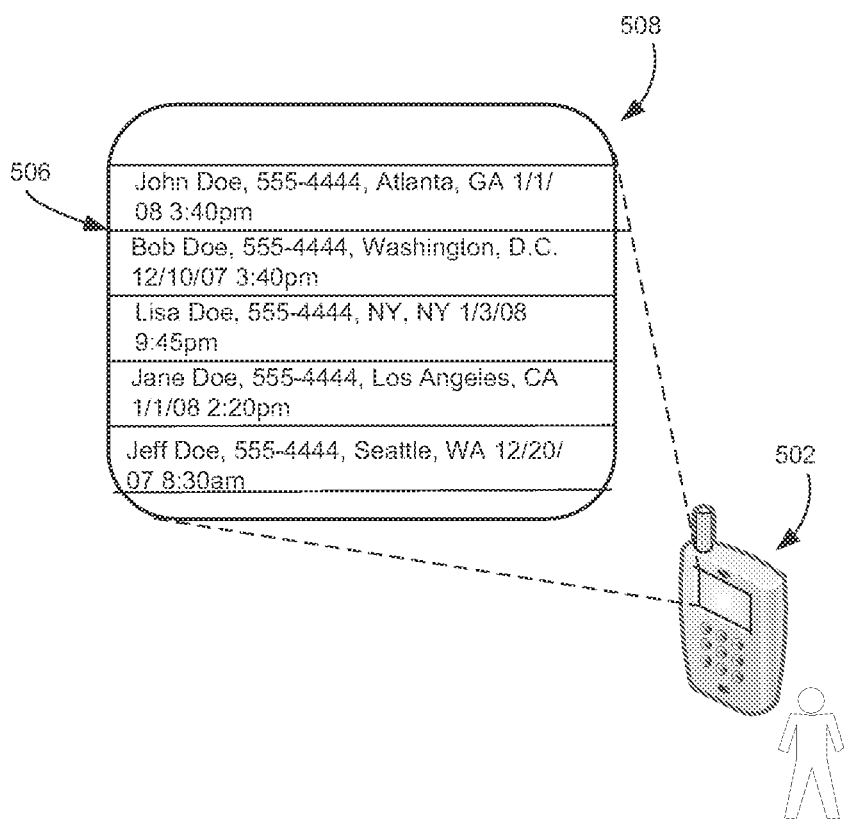
FIG. 5 is an illustration of an exemplary and non-limiting example of a display showing a list of voicemails and a location for use in conjunction with calendar-callback voicemail.

The recipient may also actively handle voicemail by using both information received from a calendar as well as location information. Exemplary location may include, but is not limited to, the location of the caller, the location of the recipient, and the location of the caller relative to the location of the recipient. FIG. 5 is an exemplary display in which a user may schedule callbacks using both calendar and location information. User 504 accesses voicemail listing 508 which lists on a display of mobile device 502 the voicemails that have been left. Various information may be provided. For example, voicemail listing 506 is from Bob Doe, located in Washington, D.C. and is scheduled for a callback at 3:40 pm. User 504 may recognize listing 506 as her boss in D.C. and designate that listing 506 receives priority scheduling. User 504 may use the location information in other ways. For example, user 504 may be located in D.C. and wish to call back voicemails received locally first and then extend outward even though the scheduled times may indicate otherwise. Listing 508 also may present other information such as the caller identification that may be provided through the use of a caller identification service. The number of the caller may also be presented and can be obtained through various means such as from the caller or retrieved from an address book or directory.

Figure 6:
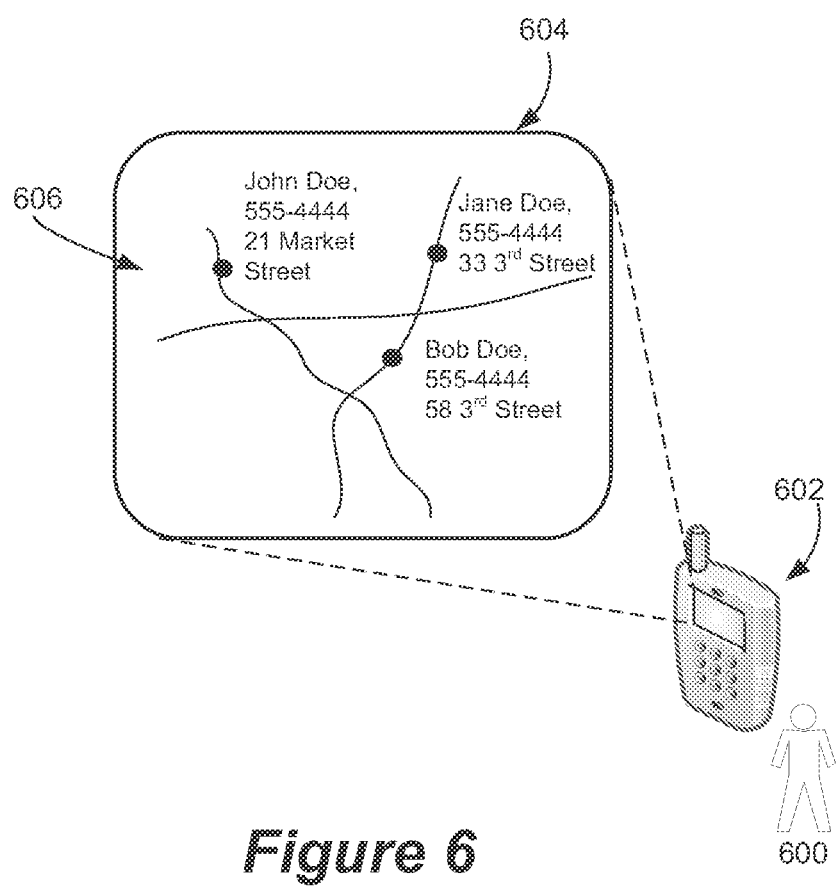
FIG. 6 is an illustration of an exemplary and non-limiting example of a display showing a map for use in conjunction with calendar-callback voicemail.

It may be easier to sort through and schedule callbacks if the information is provided graphically. FIG. 6 is an exemplary display showing location graphically. User 600, after receiving notification of voicemails, accesses display 604 of mobile device 602. Display 604 presents several locations of callers on a map. User 600 may use this information to manually or automatically create and prioritize a schedule for calling back the callers. For example, the user may be a technician assigned to handle technical issues in a certain location. User 600 may designate that location as having a higher priority. For example, user 600 may be assigned to handle technical issues on $3^{rd}$ Street which is where voicemails were left by Jane Doe and Bob Doe. A calendar callback service may use this information to prioritize the callback schedule, putting voicemail callbacks from Jane Doe and Bob Doe ahead of a callback from John Doe.

Figure 7:
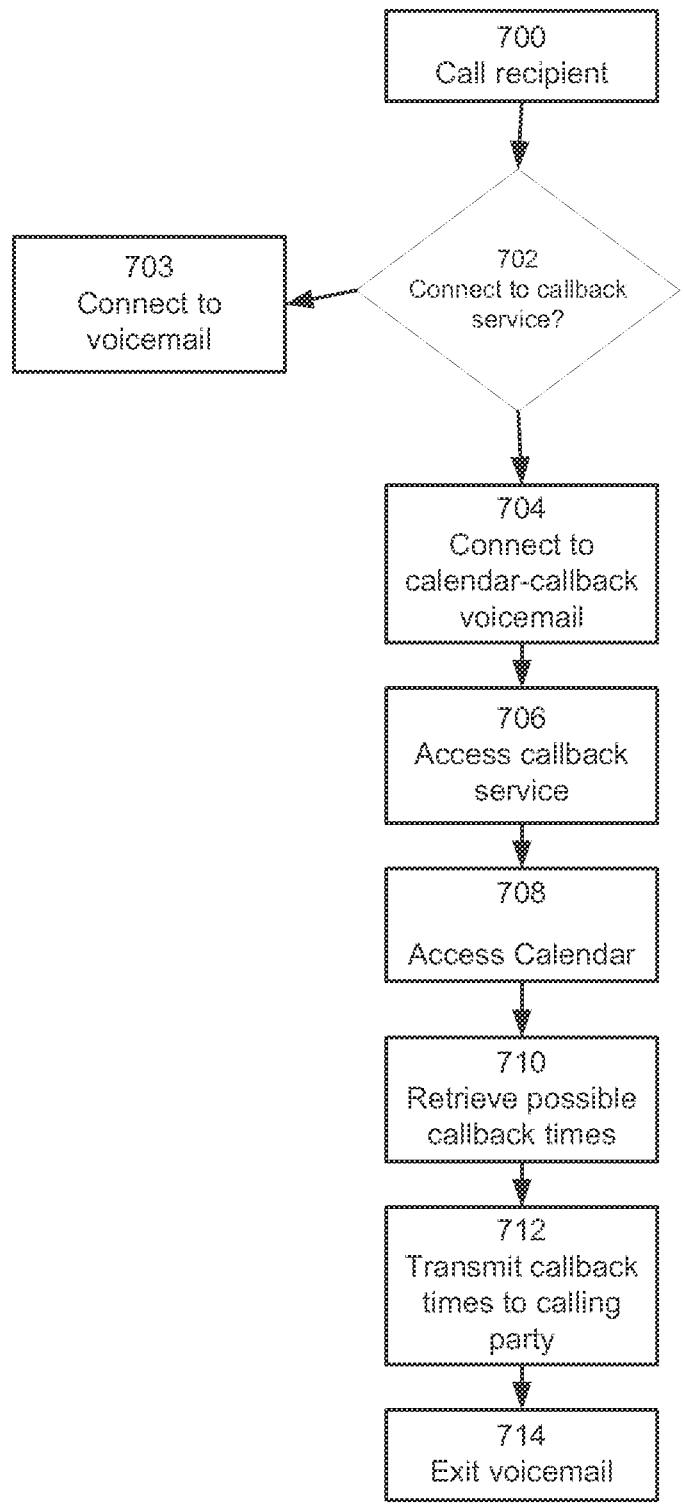
FIG. 7 is a flow diagram of an exemplary and non-limiting process for providing calendar-callback voicemail.

FIG. 7 is an exemplary method that may be used to provide for calendar-callback voicemail. At step 700 a caller calls an intended recipient. The recipient may be provided with the ability to determine at step 702 if the caller will be provided with the use of the calendar callback service. If the recipient determines that the caller is not to be provided with the services of the calendar callback service, the caller may be directed at step 703 to regular voicemail. If the recipient determines that the caller is to be provided with the services of the calendar callback service, the caller may be connected at step 704 to calendar-callback voicemail. It should be noted that the present subject matter may automatically direct the caller to calendar-callback voicemail, thus bypassing steps 702 and 703.

When the caller cannot be connected to the recipient, the caller at step 704 is connected to the recipient's voicemail service. The voicemail service at step 706 accesses the calendar callback service to attempt to schedule a callback. The callback service accesses a calendar at step 708 and retrieves possible callback times at step 710. It should be noted that the calendar may be the calendar of the recipient, the calendar of the caller, or both. The calendar may also be a calendar not directly associated with either the caller or the recipient. For example, a company may have designated callback times for their employees. If the caller calls the recipient on a mobile phone controlled by the recipient's employer, the voicemail service may access a general calendar for the entire company instead of the calendar for the recipient (employee). The calendar may also work the other way, i.e. all employees are required to leave open certain time slots in which to return calls, possibly in an effort to increase customer service.

After the possible times are retrieved, the times are transmitted to the caller at step 712. The caller may then be provided with the ability to accept the time or reject the time. As discussed above, the calendar callback service may be configured to perform various tasks if the caller accepts the time, such as placing an event on one or more calendars.

Figure 8:
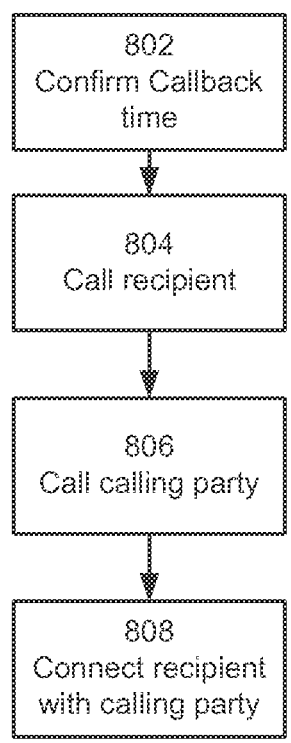
FIG. 8 is a flow diagram of an exemplary and non-limiting process for connection a caller and recipient using calendar-callback voicemail.

At or near the proposed time, the calendar callback service may also be used to help connect the caller and the recipient. FIG. 8 is an exemplary method in which the calendar callback service may be used to connect the caller and the recipient. At step 802, the calendar callback service confirms the callback time is valid. For example, the recipient and/or the caller may receive an email asking for a response to indicate that the time is valid. In another example, the calendar callback service may perform again step 706 of FIG. 7 to check to see if the proposed time is the same as the original proposed time.

After the time has been found to be valid, the calendar callback service may call the recipient at step 804, notifying the recipient (e.g., through an Interactive Voice Response (IVR) capability) that a callback was scheduled and, if the recipient wishes to proceed, the calendar callback service will attempt to call the caller at step 806. To help the recipient determine whether or not to proceed, the calendar callback service may provide various information such as the caller's identification, the time of the voicemail or perhaps play the voicemail again. If both the caller and recipient are available, the caller and the recipient are connected at step 808 and the process ends. Alternatively, the calendar callback service may initiate the calls automatically without either the caller or recipient being provided a review.

Figure 9:
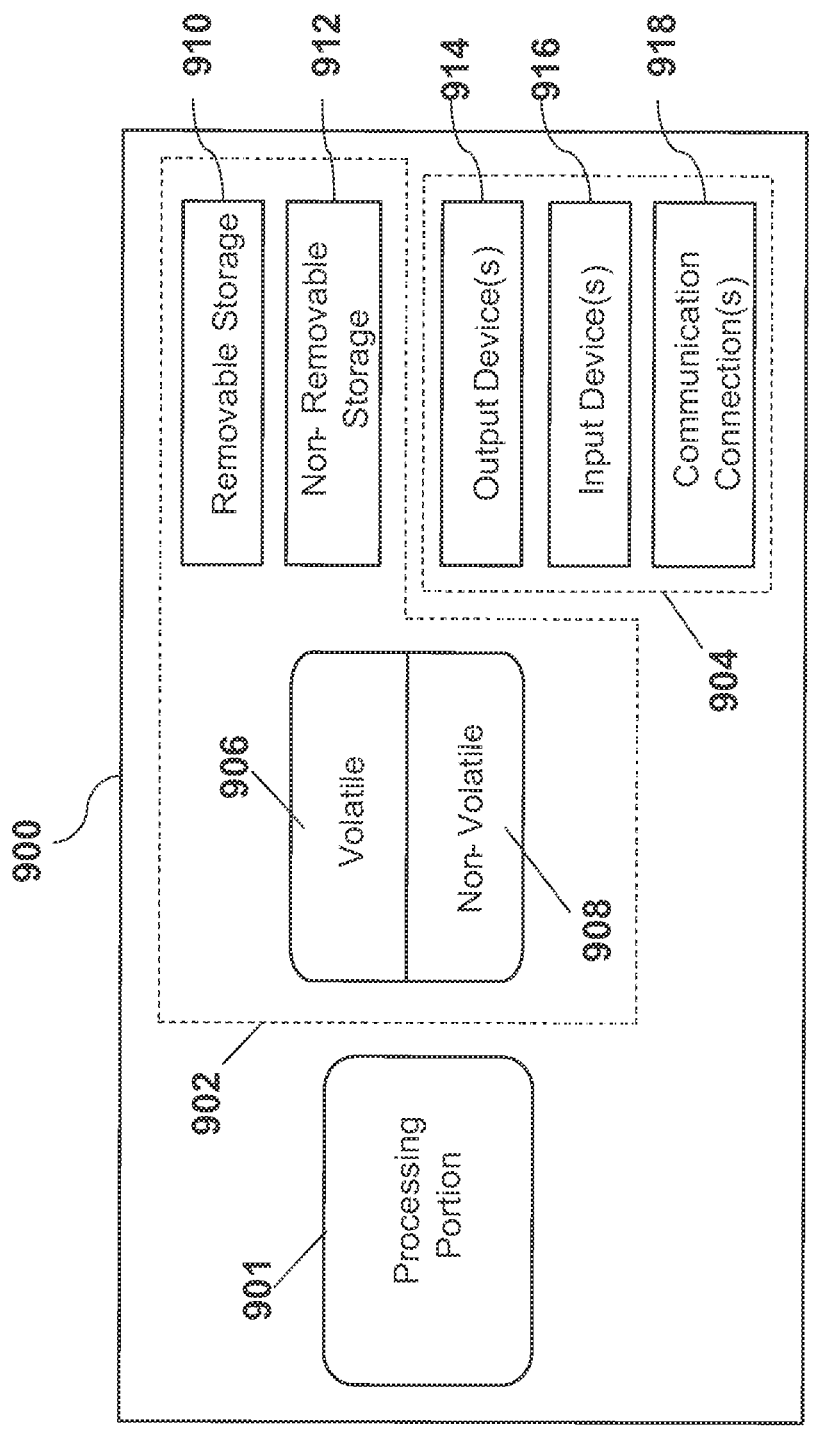
FIG. 9 is a block diagram of an example processor for generating and/or determining and transmitting and/or receiving location information in conjunction with calendar-callback voicemail.

FIG. 9 is a block diagram of an example processor 900 for implementing aspects of calendar-callback voicemail. Such a processor also may be used for determining proposed times and/or location information. In an example configuration, the processor 900 may be one component of caller mobile device 100, recipient mobile device 108, or a combination thereof, of FIG. 1. It is emphasized that the block diagram depicted in FIG. 9 is exemplary and not intended to imply a specific implementation. Thus, the processor 900 can be implemented in a single processor or multiple processors. Multiple processors can be distributed or centrally located. Multiple processors can communicate in a wireless or wired communication system, or a combination thereof.

The processor 900 comprises a processing portion 901, a memory portion 902, and an input/output portion 904. The processing portion 901, memory portion 902, and input/output portion 904 are coupled together (coupling not shown in FIG. 9) to allow communications there between. The input/output portion 904 is capable of providing and/or receiving components utilized to determine a proposed time or generate location information and transmit or receive such information as described above. For example, the input/output portion 904 is capable of accessing one or more calendars and retrieving location information, as described above.

The processor 900 can be implemented as a client processor and/or a server processor. In a basic configuration, the processor 900 can include processing portion 901 and memory portion 902. The memory portion 902 can store any information utilized in conjunction with determining a proposed time for a callback or prioritizing callbacks, for example. As described above, the memory portion is capable of storing one or more priority lists. Depending upon the exact configuration and type of processor, the memory portion 902 can be volatile (such as RAM) 906, non-volatile (such as ROM, flash memory, etc.) 908, or a combination thereof. The processor 900 can have additional features/functionality. For example, the processor 900 can include additional storage (removable storage 910 and/or non-removable storage 912) including, but not limited to, magnetic or optical disks, tape, flash, smart cards or a combination thereof. Computer storage media, such as memory portion 902, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which may be used to store the desired information and which can be accessed by the processor 900. Any such computer storage media can be part of the processor 900.

The processor 900 may also contain the communications connection(s) 918 that allow the processor 900 to communicate with other devices, for example through communications network 106 of FIG. 1. Communications connection(s) 918 may be an example of communication media. Communication media may be used to transmit information contained in computer readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media may include wired media such as a wired network or direct-wired connection as might be used with a land-line telephone, and wireless media such as acoustic, RF, infrared, cellular, and other wireless media. The term computer readable storage medium, as may be used herein, may include both storage media and communication media. The processor 900 also can have input device(s) 916 such as keyboard, keypad, mouse, pen, voice input device, touch input device, etc. Output device (s) 914 such as a display, speakers, printer, etc. also can be included.

The following description sets forth some exemplary telephony radio networks and non-limiting operating environments in which calendar-callback voicemail can be implemented. The below-described operating environments should be considered non-exhaustive, however, and thus the below-described network architectures merely show how calendar-callback voicemail can be incorporated into existing network structures and architectures. It should be appreciated that calendar-callback voicemail can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be used with other services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the disclosed subject matter can be applied independently of the method for data transport, and do not depend on any particular network architecture, or underlying protocols.

FIG. 10 illustrates an exemplary architecture of a GPRS network that may be configured to provide calendar-callback voicemail. The exemplary GPRS network is illustrated as comprising four groups: users 1000, radio access network 1002, core network 1004, and interconnect network 1006. Users 1000 comprise a plurality of end users (though only mobile subscriber 1008 is shown in FIG. 10). Radio access network 1002 comprises a plurality of base station subsystems such as BSSs 1009, which include BTSs 1010 and BSCs 1012. Core network 1004 comprises a host of various network elements. As illustrated, core network 1004 may comprise Mobile Switching Center ("MSC") 1014, Service Control Point ("SCP") 1016, gateway MSC 1018, SGSN 1020, Home Location Register ("HLR") 1022, Authentication Center ("AuC") 1024, Domain Name Server ("DNS") 1026, and GGSN 1028. Interconnect network 1006 also comprises a host of various networks and other network elements. As illustrated in FIG. 10, interconnect network 1006 comprises Public Switched Telephone Network ("PSTN") 1030, Fixed-End System ("FES") or Internet 1032, firewall 1034, and Corporate Network 1036.

A mobile switching center can be connected to a large number of base station controllers. At MSC 1014, for instance, depending on the type of traffic, the traffic may be separated in that voice may be sent to Public Switched Telephone Network ("PSTN") 1030 through Gateway MSC ("GMSC") 1018, and/or data may be sent to SGSN 1020, which then sends the data traffic to GGSN 1026 for further forwarding.

When MSC 1014 receives call traffic, for example, from BSC 1012, it sends a query to a database hosted by SCP 1016. The SCP 1016 processes the request and issues a response to MSC 1014 so that it may continue call processing as appropriate.

The HLR 1022 is a centralized database for users to register to the GPRS network. HLR 1022 stores static information about the subscribers such as the International Mobile Subscriber Identity ("IMSI"), subscribed services, and a key for authenticating the subscriber. HLR 1022 also stores dynamic subscriber information such as the current location of the mobile subscriber. Associated with HLR 1022 is AuC 1024. AuC 1024 is a database that contains the algorithms for authenticating subscribers and includes the associated keys for encryption to safeguard the user input for authentication.

In the following, depending on context, the term "mobile subscriber" sometimes refers to the end user and sometimes to the actual portable device used by an end user of the mobile cellular service. When a mobile subscriber turns on his or her mobile device, the mobile device goes through an attach process by which the mobile device attaches to an SGSN of the GPRS network. In FIG. 10, when mobile subscriber 1008 initiates the attach process by turning on the network capabilities of the mobile device, an attach request is sent by mobile subscriber 1008 to SGSN 1020. The SGSN 1020 queries another SGSN, to which mobile subscriber 1008 was attached before, for the identity of mobile subscriber 1008. Upon receiving the identity of mobile subscriber 1008 from the other SGSN, SGSN 1020 requests more information from mobile subscriber 1008. This information is used to authenticate mobile subscriber 1008 to SGSN 1020 by HLR 1022. Once verified, SGSN 1020 sends a location update to HLR 1022 indicating the change of location to a new SGSN, in this case SGSN 1020. HLR 1022 notifies the old SGSN, to which mobile subscriber 1008 was attached before, to cancel the location process for mobile subscriber 1008. HLR 1022 then notifies SGSN 1020 that the location update has been performed. At this time, SGSN 1020 sends an Attach Accept message to mobile subscriber 1008, which in turn sends an Attach Complete message to SGSN 1020.

After attaching itself with the network, mobile subscriber 1008 then goes through the authentication process. In the authentication process, SGSN 1020 sends the authentication information to HLR 1022, which sends information back to SGSN 1020 based on the user profile that was part of the user's initial setup. The SGSN 1020 then sends a request for authentication and ciphering to mobile subscriber 1008. The mobile subscriber 1008 uses an algorithm to send the user identification (ID) and password to SGSN 1020. The SGSN 1020 uses the same algorithm and compares the result. If a match occurs, SGSN 1020 authenticates mobile subscriber 1008.

Next, the mobile subscriber 1008 establishes a user session with the destination network, corporate network 1036, by going through a Packet Data Protocol ("PDP") activation process. Briefly, in the process, mobile subscriber 1008 requests access to the Access Point Name ("APN"), for example, att.com (e.g., which can be FES or Internet 1032 in FIG. 10) and SGSN 1020 receives the activation request from mobile subscriber 1008. SGSN 1020 then initiates a Domain Name Service ("DNS") query to learn which GGSN node has access to the att.com APN. The DNS query is sent to the DNS server within the core network 1004, such as DNS 1026, which is provisioned to map to one or more GGSN nodes in the core network 1004. Based on the APN, the mapped GGSN 1028 can access the corporate network 1036. The SGSN 1020 then sends to GGSN 1028 a Create Packet Data Protocol ("PDP") Context Request message that contains necessary information. The GGSN 1028 sends a Create PDP Context Response message to SGSN 1020, which then sends an Activate PDP Context Accept message to mobile subscriber 1008.

To provide for calendar-callback voicemail services, the GPRS network of FIG. 10 may also have voicemail server 1038 and calendar callback service 1042. Calendar callback service 1042 may act in a manner as described above in FIGS. 1-3, by example. If a call placed by mobile subscriber 1008 is not connected to a receiving subscriber, the call may be routed to voicemail server 1038. Voicemail server 1038 may access calendar callback service 1042 to provide a proposed time for a callback to mobile subscriber 1008. Calendar callback service 1042 may also use location information which may be provided by location server 1040. Either in conjunction with leaving a voicemail, or after a voicemail message is left by mobile subscriber 1008, voicemail server 1038 may cause location server 1040 to determine one or more locations. Calendar callback service 1042 may then use the one or more locations in various manners, as described above. It will be appreciated that, as with voicemail server 114 in FIG. 1, the voicemail server 1038 of FIG. 10 need not be local to the caller's MSC 1014 or to any particular MSC, but may be situated at any appropriate point within, or in communication with, core network 1004, and further that there may be multiple and/or distributed voicemail servers 1038.

While example embodiments of the disclosed subject matter have been described in connection with various computing devices, the underlying concepts can be applied to any computing device or system capable of implementing the disclosed subject matter. The various techniques described herein can be implemented in connection with hardware or software or, where appropriate, with a combination of both. Thus, the methods and apparatus for providing calendar-callback voicemail, or certain aspects or portions thereof, can take the form of program code (i.e., instructions) embodied in tangible media, such as floppy diskettes, CD-ROMs, DVDs, hard drives, or any other machine-readable storage medium, wherein, when the program code is loaded into and executed by a machine, such as a computer, the machine becomes an apparatus for implementing the disclosed subject matter. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for calendar-callback voicemail also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing the disclosed subject matter. When implemented on a general-purpose processor, the program code combines with the processor to provide a unique apparatus that operates to invoke the functionality of the disclosed subject matter. Additionally, any storage techniques used in connection with the disclosed subject matter can invariably be a combination of hardware and software.

While calendar-callback voicemail has been described in connection with the various embodiments of the various figures, it is to be understood that other similar embodiments can be used or modifications and additions can be made to the described embodiment for performing the same function of providing the disclosed subject matter without deviating therefrom. For example, one skilled in the art will recognize that a system for implementing calendar-callback voicemail as described may apply to any environment, whether wired or wireless, and may be applied to any number of devices connected via a communications network and interacting across the network. Therefore, calendar-callback voicemail should not be limited to any single embodiment, but rather should be construed in breadth and scope in accordance with the appended claims.

What is claimed is:

1. A method comprising:
receiving, at a voicemail server, a connection request for a recipient from a first calling party and a second connection request for the recipient from a second calling party;
determining, by a calendar module, a priority associated with the first calling party, wherein:
when the priority comprises a first priority, access the calendar of the first calling party and the calendar of the recipient; and
when the priority comprises a second priority, different from the first priority, access the calendar of the recipient and not access the calendar of the first calling party;
determining, by calendar module, a proposed connection time between the recipient and the first calling party based on at least availability as indicated by the accessed calendars;
determining, by calendar module, a priority associated with the second calling party, wherein:
when the priority comprises a first priority, access the calendar of the second calling party and the calendar of the recipient;
when the priority comprises a second priority, different from the first priority, access the calendar of the recipient and not access the calendar of the second calling party;
determining, by calendar module, a proposed connection time between the recipient and the second calling party based on at least availability as indicated by the accessed calendars;
determining, by location module, the location of first calling party and second calling party;
sending, by the voicemail server, the determined locations and corresponding proposed connection times to be displayed on a map on recipient's device; and
connecting the recipient to the first calling party or second calling party based on selection of the recipient.

2. The method of claim 1, wherein the proposed connection time comprises at least one of a time established in the at least one accessed calendar, a time determined based upon at least one calendar entry in the at least one accessed calendar, or a time based upon a set of rules.

3. The method of claim 1, wherein the proposed connection time is determined via a voice mail service.

4. The method of claim 1, further comprising:
upon receiving a notification from the first calling party that the proposed connection time is acceptable, disconnecting the first calling party.

5. The method of claim 4, wherein the notification is generated by the first calling party performing at least one of:
pressing a button on a keypad of a mobile device; or
by the first calling party speaking into a microphone of the mobile device.

6. The method of claim 1, further comprising:
confirming that the proposed connection time is valid;
at the proposed connection time, contacting the recipient to confirm that the recipient is available to place a call with the first calling party; or
connecting the first calling party with the recipient.

7. The method of claim 6, wherein confirming that the proposed connection time is valid comprises accessing the calendar of the recipient to verify that the proposed connection time is available.

8. The method of claim 6, further comprising contacting the first calling party when the recipient is available.

9. The method of claim 1, wherein the priority is based on a geographic proximity of the recipient and the first calling party.

10. The method of claim 9, wherein the priority is based on at least one of a familial relationship between the recipient and the calling party or a professional relationship between the recipient and the first calling party.

11. The method of claim 1, further comprising determining a second proposed connection time.

12. The method of claim 1, wherein the priority is based upon at least one of the location of the first calling party or a location of the recipient.

13. The method of claim 1, further comprising notifying the first calling party of the proposed connection time wherein the priority is further based on a location of a second caller associated with a callback.

14. The method of claim 1, further comprising determining a third proposed connection time.

15. The method of claim 1, further comprising notifying the first calling party of the proposed connection time via at least one of a message sent via email, a short message service, an instant messaging service, or an automated phone call.

16. The method of claim 1, further comprising notifying the first calling party when the proposed connection time is no longer available.

17. The method of claim 1, further comprising providing an indication of the proposed connection time to a third party.

18. The method of claim 17, wherein the third party is an assistant to the recipient.

19. The method of claim 1, further comprising determining a number for the first calling party.

20. The method of claim 19, wherein the number is retrieved through the use of a caller identification service, the number is provided by the caller, or the number is retrieved from an address book or directory.

21. A system comprising:
- a voicemail server configured to receive a connection request for a recipient from a first calling party and a second connection request for the recipient from a second calling party; and
- a scheduling service in communication with the voicemail server, the scheduling service comprising:
  - a processor; and
  - memory coupled with the processor, the memory comprising executable instructions that when executed by the processor cause the processor to effectuate operations comprising:
    - determining a priority associated with the first calling party, wherein:
      - when the priority comprises a first priority, access the calendar of the first calling party and the calendar of the recipient; and
      - when the priority comprises a second priority, different from the first priority, access the calendar of the recipient and not access the calendar of the first calling party;
    - determining a proposed connection time between the recipient and the first calling party based on at least availability as indicated by the accessed calendars;
    - determining a priority associated with the second calling party, wherein:
      - when the priority comprises a first priority, access the calendar of the second calling party and the calendar of the recipient;
      - when the priority comprises a second priority, different from the first priority, access the calendar of the recipient and not access the calendar of the second calling party;
    - determining a proposed connection time between the recipient and the second calling party based on at least availability as indicated by the accessed calendars;
    - determining, by location module, the location of first calling party and second calling party;
    - sending, by the voicemail server, the determined locations and corresponding proposed connection times to be displayed on a map; and
    - providing instructions to connect the recipient to the first calling party or second calling party based on selection of the recipient.

22. The system of claim 21, wherein the scheduling service is further configured to:
- confirm that the proposed connection time is valid;
- at the proposed connection time, contact the recipient to confirm that the recipient is available to place a call with the first calling party; or
- connect the first calling party with the recipient.

23. The system of claim 21, wherein qualifying the first calling party comprises determining that the first calling party has a medium level of qualification, wherein configuration of the scheduling service to access a calendar service comprises accessing a calendar with the recipient, wherein the proposed connection time is a time based on the calendar associated with the recipient.

24. The system of claim 21, wherein the system is configured to connect the first calling party to voicemail with no proposed connection time when a priority of the first calling party cannot be determined.

25. A computer-readable storage device, the computer-readable storage device having computer-executable instruction stored thereon, that when executed by a processor perform acts comprising:
- receiving, at a voicemail server, a connection request for a recipient from a first calling party and a second connection request for the recipient from a second calling party;
- determining, by a calendar module, a priority associated with the first calling party, wherein:
  - when the priority comprises a first priority, access the calendar of the first calling party and the calendar of the recipient; and
  - when the priority comprises a second priority, different from the first priority, access the calendar of the recipient and not access the calendar of the first calling party;
- determining, by calendar module, a proposed connection time between the recipient and the first calling party based on at least availability as indicated by the accessed calendars;
- determining, by calendar module, a priority associated with the second calling party, wherein:
  - when the priority comprises a first priority, access the calendar of the second calling party and the calendar of the recipient;
  - when the priority comprises a second priority, different from the first priority, access the calendar of the recipient and not access the calendar of the second calling party;
- determining, by calendar module, a proposed connection time between the recipient and the second calling party based on at least availability as indicated by the accessed calendars;
- determining, by location module, the location of first calling party and second calling party;
- sending, by the voicemail server, the determined locations and corresponding proposed connection times to be displayed on a map on recipient's device; and
- providing instructions to connect the recipient to the first calling party or second calling party based on selection of the recipient.

26. The computer-readable storage device of claim 24, wherein the priority is based upon at least one of a familial relationship of the calling party with the recipient, a working relationship between the calling party and the recipient, or a social network.

27. The computer-readable storage device of claim 25, wherein the priority is based on a geographic proximity of the recipient and the calling party.

28. The computer-readable storage device of claim 25, the instructions further for performing acts comprising:
- confirming that the proposed connection time is valid;
- at the proposed connection time, contacting the recipient to confirm recipient is available to place a call with the calling party; or
- connecting the calling party with the recipient.

29. The computer-readable storage device of claim 25, the instructions further for performing acts comprising contacting the calling party when the recipient is available.

30. The computer-readable storage device of claim 25, the instructions further for performing acts comprising determining a second proposed connection time.

31. The computer-readable storage device of claim 25, wherein the priority is based on the calling party being a co-worker of the recipient or the calling party being a member of a social network of the recipient.

* * * * *